United States Patent
Choi et al.

(10) Patent No.: US 10,260,710 B2
(45) Date of Patent: Apr. 16, 2019

(54) REFLECTIVE DIFFUSION LENS AND LIGHTING INSTALLATION INCLUDING THE REFLECTIVE DIFFUSION LENS

(71) Applicant: SAMSUNG ELECTRONICS CO., LTD., Suwon-si, Gyeonggi-do (KR)

(72) Inventors: Hyun Choi, Suwon-si (KR); Cheoul Young Kim, Suwon-si (KR); Keun Bum Lee, Suwon-si (KR); Seung Jae Lee, Seoul (KR); Young Chol Lee, Hwaseong-si (KR); Yae Kyung Son, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 15/220,738

(22) Filed: Jul. 27, 2016

(65) Prior Publication Data

US 2017/0059131 A1 Mar. 2, 2017

(30) Foreign Application Priority Data

Aug. 28, 2015 (KR) .................. 10-2015-0121766

(51) Int. Cl.
*F21V 13/04* (2006.01)
*F21V 7/00* (2006.01)
(Continued)

(52) U.S. Cl.
CPC ............. *F21V 13/04* (2013.01); *F21V 5/046* (2013.01); *F21V 7/0033* (2013.01); *F21V 7/0091* (2013.01); *F21V 7/06* (2013.01)

(58) Field of Classification Search
CPC .......... F21V 5/045; F21V 5/046; F21V 13/04; F21V 7/0033; F21V 7/06; F21V 7/0091;
(Continued)

(56) References Cited

U.S. PATENT DOCUMENTS 7,347,590 B2 * 3/2008 Lee .................... G02B 19/0071
362/327
8,979,321 B2 * 3/2015 Hukkanen ................. F21V 5/04
362/308
(Continued)

FOREIGN PATENT DOCUMENTS

KR       20060055706 A  *  5/2006
KR         10-0756174       2/2007
(Continued)

OTHER PUBLICATIONS

Machine translation of KR101287023, European Patent Office, https://worldwide.espacenet.com/publicationDetails/biblio?DB=EPODOC&II=0&ND=3&adjacent=true&locale=en_EP&FT=D&date=20130717&CC=KR&NR=101287023B1&KC=B1#, retrieved Apr. 1, 2018.*

(Continued)

*Primary Examiner* — Suezu Ellis
(74) *Attorney, Agent, or Firm* — Staas & Halsey LLP

(57) ABSTRACT

A direct-type reflective diffusion lens and a lighting installation including the reflective diffusion lens. The reflective diffusion lens includes a first reflective surface concave and having a longitudinal cross-section with a parabola shape or normal distribution shape to totally reflect incident light, and a bottom surface comprising a light incident surface concave toward the first reflective surface. The reflective diffusion lens includes a second reflective surface having a longitudinal cross-section inclined by a first angle with respect to a central axis of the lens to totally reflect incident light and a refractive surface connecting the first reflective surface with the bottom surface. The refractive surface includes a first refractive surface having a longitudinal cross-section inclined by a second angle with respect to the central axis and a second refractive surface having a longitudinal cross- (Continued)

section inclined by a third angle with respect to the central axis.

16 Claims, 14 Drawing Sheets

(51) Int. Cl.
*F21V 7/06* (2006.01)
*F21V 5/04* (2006.01)

(58) Field of Classification Search
CPC ............ G02B 19/0028; G02B 19/0061; G02B 19/0071
See application file for complete search history.

(56) References Cited

U.S. PATENT DOCUMENTS

2003/0235050 A1 12/2003 West et al.
2006/0152820 A1* 7/2006 Lien .......................... F21V 5/04
 359/726
2014/0043826 A1* 2/2014 Seo .......................... F21V 13/04
 362/309

FOREIGN PATENT DOCUMENTS

KR 10-1287023 2/2012
KR 10-2014-0123134 10/2014

OTHER PUBLICATIONS

Machine translation of KR20060055706, European Patent Office, https://worldwide.espacenet.com/publicationDetails/biblio?CC=KR&NR=20060055706A&KC=A&FT=D&ND=3&date=20060524&DB=EPODOC&locale=en_EP, retrieved Apr. 2, 2018.*

* cited by examiner

REFLECTIVE DIFFUSION LENS AND LIGHTING INSTALLATION INCLUDING THE REFLECTIVE DIFFUSION LENS

CROSS-REFERENCE TO RELATED APPLICATION(S)

This application claims the benefit of priority to Korean Patent Application No. 10-2015-0121766, filed on Aug. 28, 2015 with the Korean Intellectual Property Office, the disclosure of which is incorporated herein by reference.

TECHNICAL FIELD

Embodiments of the present disclosure relate to a direct-type reflective diffusion lens and a lighting installation including the reflective diffusion lens.

BACKGROUND

Liquid crystal displays (LCDs) include back light units (BLUs), the BLUs classified into direct-type BLUs and light guide plate-type BLUs.

In the case of using the light guide plate-type BLU, a surface light source may be manufactured to have an area of 1 m$^2$ and a thickness of 10 mm or less and a brightness uniformity of 80% or greater. However, as a light guide plate increases in size, a processing yield may decrease, manufacturing costs may increase, and luminous efficiency may decrease.

The direct-type lighting installation has higher luminous efficiency than a light guide plate-type lighting installation, thus, the number of light emitting diodes (LEDs) being used may be reduced and manufacturing costs of a light guide plate are saved.

SUMMARY

Therefore, it is an aspect of the present disclosure to provide a reflective diffusion lens including a first reflective surface to totally reflect incident light and a second reflective surface to reflect light toward the first reflective surface, and a lighting installation including the reflective diffusion lens.

It is another aspect of the present disclosure to provide a reflective diffusion lens including a refractive surface to uniformly distribute light totally reflected by the first reflective surface, and a lighting installation including the reflective diffusion lens.

Additional aspects of the disclosure will be set forth in part in the description which follows and, in part, will be obvious from the description, or may be learned by practice of the disclosure.

In accordance with one aspect of the present disclosure, the reflective diffusion lens may include a first reflective surface concave and having a longitudinal cross-section with a parabola shape or normal distribution shape to totally reflect incident light; a bottom surface comprising a light incident surface concave toward the first reflective surface, and a second reflective surface having a longitudinal cross-section inclined by a first angle with respect to a central axis of the lens to totally reflect incident light; and a refractive surface connecting the first reflective surface with the bottom surface and comprising a first refractive surface having a longitudinal cross-section inclined by a second angle with respect to the central axis and a second refractive surface having a longitudinal cross-section inclined by a third angle with respect to the central axis.

The second angle may be an obtuse angle, and the third angle is an acute angle.

The second angle may be greater than the third angle.

The transverse cross-section of the reflective diffusion lens may be formed to have a diameter increasing and then decreasing in a direction from the first reflective surface to the bottom surface.

The transverse cross-section of the reflective diffusion lens comprising the first refractive surface may have a diameter increasing in a direction from the first reflective surface to the bottom surface, and the transverse cross-section of the reflective diffusion lens comprising the second refractive surface has a diameter decreasing in the direction from the first reflective surface to the bottom surface.

The transverse cross-section of the reflective diffusion lens may have a diameter variation rate comprising at least one inflection point in the direction from the first reflective surface to the bottom surface.

The second reflective surface may have a longitudinal cross-section inclined by the first angle with respect to the central axis of the lens to totally reflect incident light toward the first reflective surface.

The bottom surface may further comprise a third reflective surface connecting the second reflective surface with the refractive surface.

The third reflective surface may have a longitudinal cross-section formed of at least one line, at least one curve, or a combination of lines and curves.

The light incident surface may have a longitudinal cross-section formed of a plurality of lines, at least one curve, or a combination of lines and curves.

The reflective diffusion lens may be symmetrical about the central axis of the lens.

The reflective diffusion lens may have a rotationally symmetrical structure about the central axis of the lens.

At least one selected from the group consisting of the first reflective surface, the bottom surface, and the refractive surface may have a pattern entirely or partially formed thereon.

A light installation may include a light source; a reflective diffusion lens arranged to be adjacent to the light source and configured to diffuse light emitted from the light source; and a reflection plate configured to support the light source and the reflective diffusion lens and adjust a direction or amount of incident light, wherein the reflective diffusion lens comprises: a first reflective surface concave and having a longitudinal cross-section with a parabola shape or normal distribution shape to totally reflect incident light; a bottom surface comprising a light incident surface concave toward the first reflective surface, and a second reflective surface having a longitudinal cross-section inclined by a first angle with respect to a central axis of the lens to totally reflect incident light; and a refractive surface connecting the first reflective surface with the bottom surface and comprising a first refractive surface having a longitudinal cross-section inclined by a second angle with respect to the central axis and a second refractive surface having a longitudinal cross-section inclined by a third angle with respect to the central axis.

The second angle may be an obtuse angle, and the third angle be an acute angle.

The second angle may be greater than the third angle.

A transverse cross-section of the reflective diffusion lens may be formed to have a diameter increasing and then decreasing in a direction from the first reflective surface to the bottom surface.

The transverse cross-section of the reflective diffusion lens comprising the first refractive surface has a diameter increasing in a direction from the first reflective surface to the bottom surface, and the transverse cross-section of the reflective diffusion lens comprising the second refractive surface may have a diameter decreasing in the direction from the first reflective surface to the bottom surface.

The transverse cross-section of the reflective diffusion lens may have a diameter variation rate comprising at least one inflection point in the direction from the first reflective surface to the bottom surface.

The second reflective surface may have a longitudinal cross-section inclined by the first angle with respect to the central axis of the lens to totally reflect incident light toward the first reflective surface.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
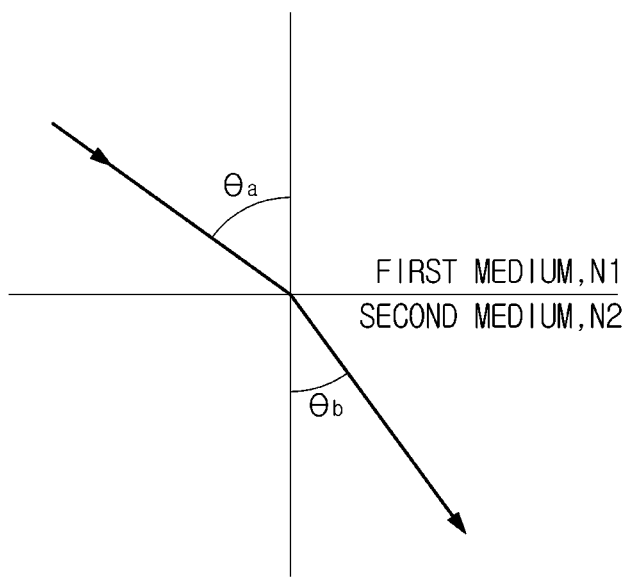
FIG. 1 is a schematic view for describing Snell's law.

Reference will now be made in detail to the embodiments of the present disclosure, examples of which are illustrated in the accompanying drawings, wherein like reference numerals refer to like elements throughout.

Hereinafter, a reflective diffusion lens and a lighting installation including the reflective diffusion lens will be described in detail with reference to the accompanying drawings.

Throughout the specification, angles may be expressed in the range of 0° to 180° relative to a central axis of the reflective diffusion lens or a virtual central axis C1, C2, or C3 parallel to the central axis of the reflective diffusion lens.

Also, the reflective diffusion lens may be referred to as a lens for descriptive convenience.

The reflective diffusion lens according to an embodiment may be designed such that light emitted from a light source is uniformly diffused to the surroundings. In general, light emitted from the light source decreases in intensity of illumination as the light is diffused farther away therefrom. Thus, it is important to widely spread out light to the surroundings to implement a lighting installation.

In addition, the reflective diffusion lens according to the present embodiment may be designed to decrease in height and diameter. As the height of the lens decreases, a slimmer lighting installation may be manufactured. As the diameter of the lens decreases, the volume of the lens decreases, thereby reducing manufacturing costs of the lighting installation.

To this end, the reflective diffusion lens according to an embodiment may be designed such that light entering the lens is totally reflected by reflective surfaces of the lens. Hereinafter, Snell's law and conditions for total reflection of light will be described to assist the understanding of the present disclosure before describing the reflective diffusion lens according to an embodiment.

In general, light exhibits properties of a wave such as refraction and reflection. Light having relatively short wavelengths travels in straight lines. When light reaches a boundary between different media, the light is partially reflected and partially refracted at the boundary surface.

Snell's law states that when a wave passes from one medium to another, the ratio of a sine value of an angle of incidence to a sine value of an angle of refraction is always the same. All waves including light obey Snell's law.

FIG. 1 is a schematic view for describing Snell's law.

Referring to FIG. 1, refraction of light may be observed when light passes from a first medium to a second medium. Refraction of light may be explained based on Snell's law, and Snell's law may be represented by Equation 1 below.

$$\frac{\sin(\Theta a)}{\sin(\Theta b)} = \frac{N2}{N1} \qquad \text{Equation 1}$$

In Equation 1, N1 denotes a refractive index of the first medium, N2 denotes a refractive index of the second medium, θa denotes an angle of incidence, and θb denotes an angle of refraction.

Referring to Equation 1, if a wave is incident on and refracted at a boundary between one isotropic medium and another isotropic medium, an incidence surface and a refractive surface are the same plane, and a sin(θa)/sin(θb) value is the same as a ratio of an absolute refractive index of the second medium/an absolute refractive index of the first medium (N2/N1). In other words, if the angle of incidence (θa) is greater than the angle of refraction (θb), the refractive index N2 of the second medium is smaller than the refractive index N1 of the first medium. The absolute refractive index refers to a refractive index when light is incident on a material in a vacuum. The sin(θa)/sin(θb) value or the ratio of absolute refractive indices of two media is referred to as a relative refractive index, which is always the same according to Snell's law.

Although FIG. 1 exemplarily illustrates a case in which light passes from the first medium with a lower refractive index to the second medium with a higher refractive index, light may pass from the second medium with the higher refractive index to the first medium with the lower refractive index, if required. Hereinafter, a medium with a higher refractive index may be referred to as a denser medium, and a medium with a lower refractive index may be referred to as a less-dense medium, for descriptive convenience.

When light passes from the denser medium to the less-dense medium and an angle of incidence of the light is greater than a critical angle, total reflection may occur.

Total reflection refers to 100% reflection of light and occurs when light proceeds from a denser medium to a less-dense medium at an angle of incidence greater than a critical angle. In other words, if the angle of incidence is greater than the critical angle when light is incident on a medium boundary from an optically denser medium to a less-dense medium, light is totally reflected at the medium boundary with no refraction. This phenomenon is called total reflection. The critical angle is a minimum angle of incidence above which the total reflection occurs.

The critical angle θc may be represented by Equation 2 below.

$$\theta c = \sin^{-1}\left(\frac{N1}{N2}\right) \quad \text{Equation 2}$$

For example, when the refractive index N2 of the denser medium is 1.49 and the refractive index N1 of the less-dense medium is 1, the critical angle of light may be determined as about 42.15. That is, when the angle of incidence of light incident on the boundary from the denser medium is greater than 42.15, the light may be totally reflected.

Figure 2:
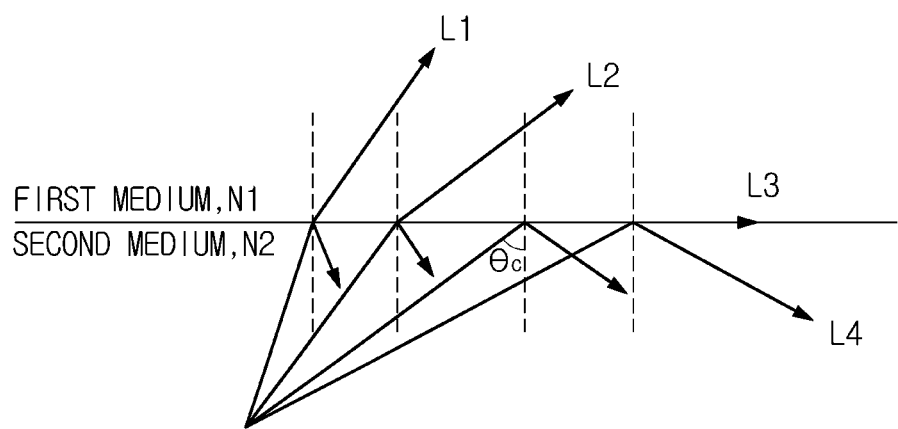
FIG. 2 is a view for describing a principle of total reflection of light.

FIG. 2 is a view for describing a principle of total reflection of light.

Referring to FIG. 2, if the angle of incidence of light is greater than the critical angle when light proceeds from the second medium, which is a denser medium, to the first medium, which is a less-dense medium, it is confirmed that the light is totally reflected.

Particularly, L1 and L2 are light rays incident on the medium boundary at angles of incidence less than the critical angle. In this cases, light is partially refracted toward the first medium and partially reflected toward the second medium.

L3 is a light ray incident on the medium boundary at the critical angle θc. At this angle, total reflection of light is initialed.

L4 is a light ray incident on the medium boundary at an angle of incidence greater than the critical angle. In this case, light is totally reflected and returns to the second medium.

The reflective diffusion lens according to the present embodiment is made of a material having a refractive index higher than that of air. Thus, the reflective diffusion lens may be designed such that light is totally reflected in the reflective diffusion lens in consideration of the angle of incidence of light incident on the reflective surface of the reflective diffusion lens. As a result, light may be uniformly diffused to the surroundings of the lens.

Hereinafter, the reflective diffusion lens according to an embodiment will be described in more detail based on the aforementioned Snell's law and the principle of total reflection of light.

Figure 3:
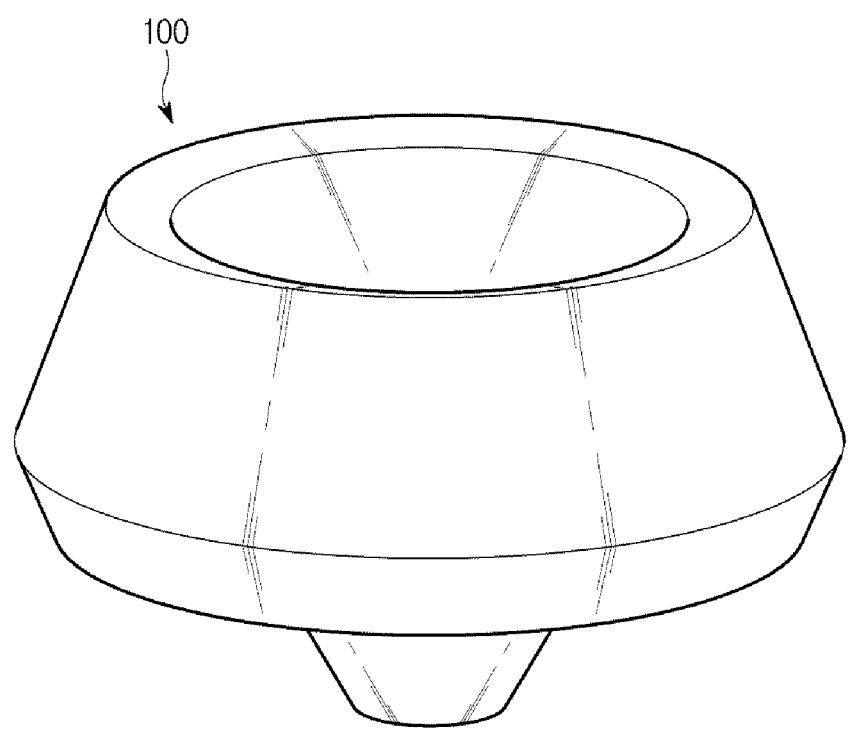
FIG. 3 is a perspective view illustrating a reflective diffusion lens according to an embodiment of the present disclosure.
Figure 4:
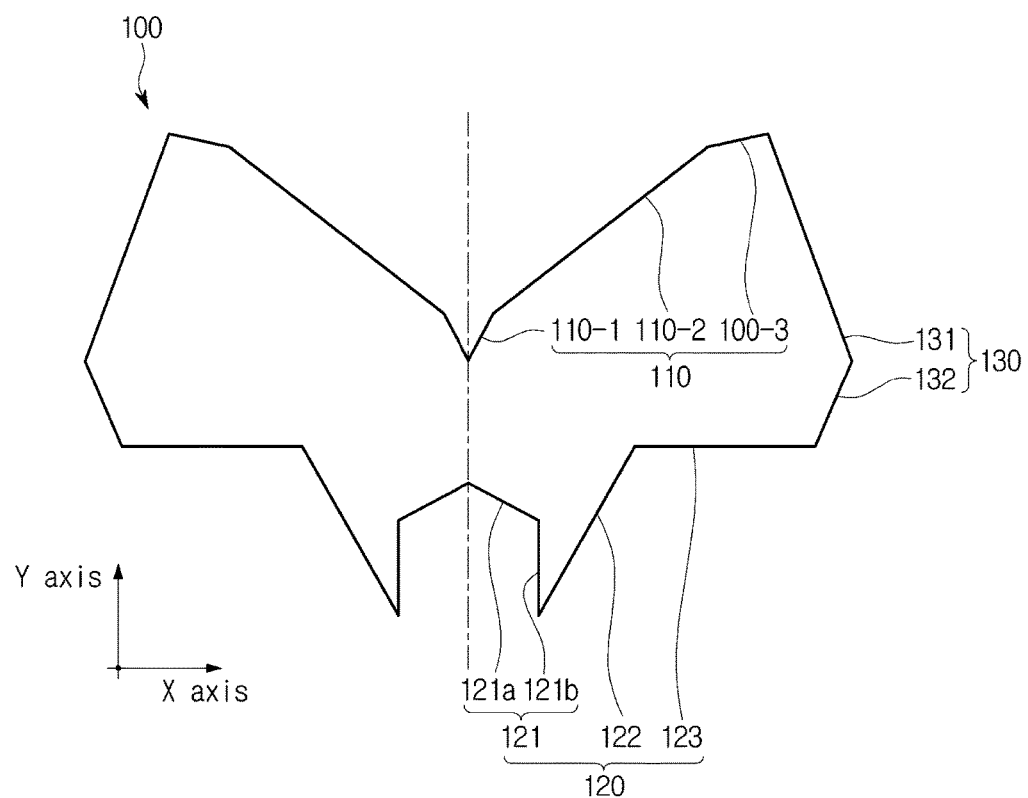
FIGS. 4 and 5 are longitudinal cross-sectional views illustrating the reflective diffusion lens.
Figure 5:
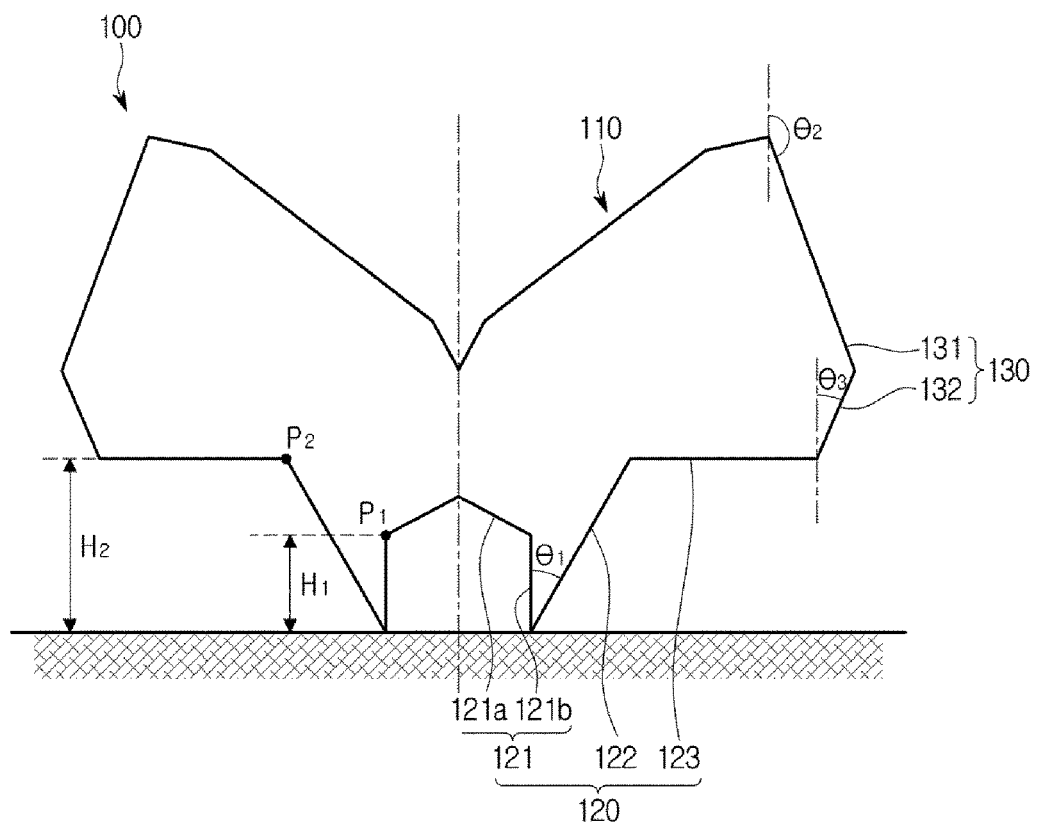

FIG. 3 is a perspective view illustrating a reflective diffusion lens according to an embodiment. FIGS. 4 and 5 are longitudinal cross-sectional views illustrating the reflective diffusion lens.

Referring to FIGS. 3 to 5, the reflective diffusion lens includes a first reflective surface 110, a bottom surface 120, and a refractive surface 130 connecting the first reflective surface 110 with the bottom surface 120. Here, the bottom surface 120 may include a light incident surface 121 and a second reflective surface 122.

The first reflective surface 110 may be concave toward the bottom surface 120. A longitudinal cross-section of the concave first reflective surface 110 may have a parabola shape or normal distribution shape for total reflection of light incident on the first reflective surface 110.

The first reflective surface 110 is formed such that light incident on the first reflective surface 110 is totally reflected. Particularly, the first reflective surface 110 may be formed such that light, which has passed through the light incident surface 121 and then has been incident on the first reflective surface 110, or light, which has passed through the light incident surface 121, has been totally reflected by the second reflective surface 122, and then has been incident on the first reflective surface 110, is totally reflected.

To this end, the parabola shape or normal distribution shape of the longitudinal cross-section of the first reflective surface 110 may be formed of a plurality of lines, at least one curve, or a combination of lines and curves. If the longitudinal cross-section of the first reflective surface 110 includes a plurality of lines or curves, a slope of each section may be determined such that all light rays incident on the first reflective surface 110 is totally reflected.

Hereinafter, a central axial direction of the lens is referred to as y-axis, and an axial direction perpendicular to the central axis of the lens is referred to as x-axis. In this case, the slope of the first reflective surface 110 may be a ratio of a length in the y-axial direction to a length in the x-axial direction of the first reflective surface 110.

According to an embodiment, the first reflective surface 110 may include a first-1 reflective surface 110-1, a first-2 reflective surface 110-2, and a first-3 reflective surface 110-3, and slopes of the respective reflective surfaces 110-1, 110-2, and 110-3 may be determined to totally reflect all light rays incident on each section of the reflective surfaces 110-1, 110-2, and 110-3.

According to an embodiment, as the slope of the first reflective surface 110 decreases, a volume of light partially reflected decreases, and thus luminous efficiency of the lens may be increased. However, when the slope of the first reflective surface 110 is too low, the reflective diffusion lens 100 may have an excessively large width. Thus, the slope of the first reflective surface 110 may be adjusted according to the intended application thereof.

The bottom surface 120 may include the light incident surface 121 concave toward the first reflective surface 110 and the second reflective surface 122 formed to totally reflect light incident thereon.

The light incident surface 121 is a surface on which light emitted from the light source is incident. The light incident surface 121 may be concave toward the first reflective surface 110. More particularly, the light incident surface 121 may be formed to surround the light source such that light emitted from the light source is incident on the first reflective surface 110 and the second reflective surface 122 with high efficiency.

The light incident surface 121 may be formed such that light that passes through the light incident surface 121 and is incident on the first reflective surface 110 or the second reflective surface 122 is totally reflected by the first reflective surface 110 and the second reflective surface 122.

The longitudinal cross-section of the light incident surface 121 may be formed of a plurality of lines, at least one curve, or a combination of lines and curves.

Referring to FIGS. 1 to 3, the light incident surface 121 may include a first light incident surface 121a constituting an upper surface of the light incident surface 121 and a second light incident surface 121b constituting a side surface of the light incident surface 121.

The first light incident surface 121a may be concave toward the first reflective surface 110. Although the first light incident surface 121a has a longitudinal cross-section formed of a single line as illustrated in FIGS. 1 to 3, the shape of the first light incident surface 121a is not limited thereto.

Figure 6:
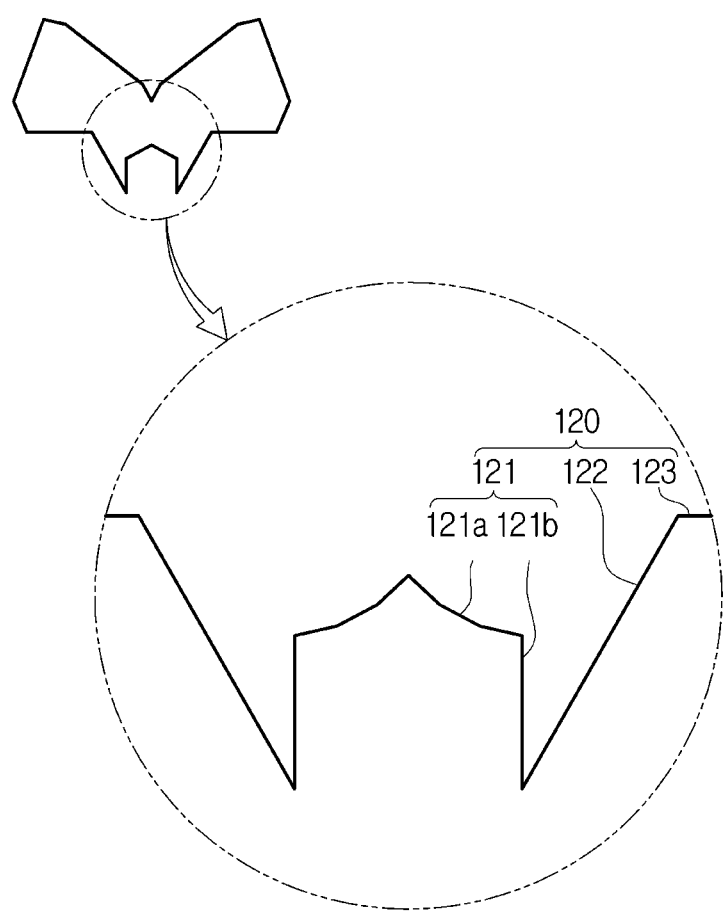
FIG. 6 is a view exemplarily illustrating the first light incident surface according to an embodiment of the present disclosure.

FIG. 6 is a view exemplarily illustrating the first light incident surface 121a according to an embodiment.

Referring to FIG. 6, the first light incident surface 121a according to an embodiment may be formed such that an absolute value of a tangent slope of the first light incident surface 121a decreases as it is farther from the central axis of the lens. Since the angle of incidence of light incident on the second reflective surface 122 varies depending on the tangent slope of the first light incident surface 121a, the first light incident surface 121a may be designed such that light is incident on the second reflective surface 122 at an angle greater than the critical angle.

The second light incident surface 121b may have a longitudinal cross-section formed of at least one line or curve. The second light incident surface 121b may be inclined by an angle ranging from 90° to 180° with respect to the central axis of the lens.

Hereinafter, an angle of the second light incident surface 121b indicates an angle of the second light incident surface 121b with respect to the central axis of the lens. A height H1 of the second light incident surface 121b indicates that a perpendicular distance between a contact point P1 of the first light incident surface 121a and the second light incident surface 121b and a support surface supporting the lens.

According to an embodiment, an angle and height of the second reflective surface 122 may be determined in accordance with the angle and height of the second light incident surface 121b. Thus, the angle and height of the second light incident surface 121b may be designed in consideration thereof.

In addition, as the angle of the second light incident surface 121b approaches 180° and the height thereof decreases, an amount of light passing through the first light incident surface 121a may relatively increase. Thus, the angle and height of the second light incident surface 121b may be designed in consideration thereof.

Some light rays emitted from the light source may be incident on the first light incident surface 121a, and some light rays may be incident on the second light incident surface 121b. The light rays incident on the first light incident surface 121a are refracted at the first light incident surface 121a and incident on the first reflective surface 110 according to Snell's law. The light rays incident on the second light incident surface 121b may be incident on the second reflective surface 122 in the same manner.

The second reflective surface 122 may be inclined by a first angle θ1 with respect to the central axis of the lens.

Hereinafter, the angle of the second reflective surface 122 may refer to an angle inclined with respect to the central axis of the lens.

The angle of the second reflective surface 122 may be determined such that light incident on the second reflective surface 122 is totally reflected toward the first reflective surface 110. In other words, the angle of the second reflective surface 122 may be determined such that all light rays are incident on the second reflective surface 122 at angles greater than the critical angle.

Figure 7:
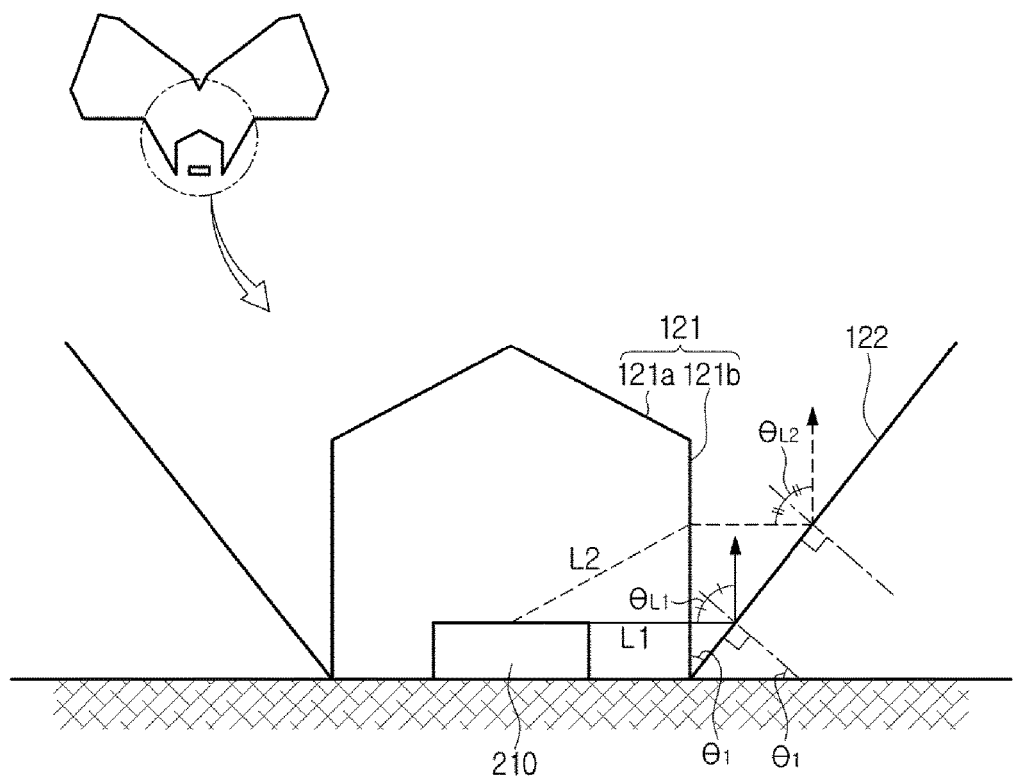
FIG. 7 is a view illustrating a total reflection path of light incident on the second reflective surface.

FIG. 7 is a view illustrating a total reflection path of light incident on the second reflective surface 122.

FIG. 7 exemplarily illustrates the longitudinal cross-section of the second light incident surface 121b formed of a single line parallel to the central axis of the lens for descriptive convenience.

Referring to FIG. 7, among light rays emitted from the light source, one light ray L1 emitted perpendicularly to the central axis of the lens may be incident on the second reflective surface 122 at an angle of incidence θL1 which is smaller than an angle of incidence θL2 of another light ray L2 emitted in a direction within a range of 0° to 90° with respect to the central axis of the lens and incident on the second reflective surface 122.

In this regard, the light rays L1 and L2 incident on the second reflective surface 122 may be totally reflected in accordance with a rotation angle of the second reflective surface 122 with respect to the central axis of the lens. In other words, the light rays L1 and L2 incident on the second reflective surface 122 may be totally reflected by adjusting the rotation angle of the second reflective surface 122 with respect to the central axis of the lens.

Referring to FIG. 7, if the slope of the second reflective surface 122 is designed to be greater than the critical angle of the light ray L1 with respect to the second reflective surface 122, all light rays including the light rays L1 and L2 may be incident on the second reflective surface 122 at angles greater than the critical angle in this structure of the lens. Thus, the rotation angle of the second reflective surface 122 may be designed to be greater than the critical angle of the light ray L1 with respect to the second reflective surface 122.

According to an embodiment, when the first angle θ1 that is a rotation angle of the second reflective surface 122 is too large, the lens may have an excessively large width. Thus, the first angle θ1 may be adjusted in consideration of the width of the lens according to the intended application thereof.

Meanwhile, a height H2 of the second reflective surface 122 may be determined in accordance with the angle and height of the second light incident surface 121b. Here, the height H2 of the second reflective surface 122 indicates a perpendicular distance from a highest point P2 of the second reflective surface 122 to a support surface supporting the lens. For example, as the second light incident surface 121b approaches a position parallel to the central axis, the height H2 of the second reflective surface 122 may decrease. As the angle of the second light incident surface 121b approaches 90°, the height H2 of the second reflective surface 122 may increase. In addition, the height H2 of the second reflective surface 122 may be designed to decrease as the height H1 of the second light incident surface 121b decreases.

Thus, the angle of the second light incident surface 121b or the height H1 of the second light incident surface 121b may be adjusted in accordance with the height H2 of the second reflective surface 122 according to the intended application thereof.

According to an embodiment, the bottom surface 120 may further include a third reflective surface 123 connecting the second reflective surface 122 with the refractive surface 130.

The third reflective surface 123 may be formed of at least one line, at least one curve, or a combination of lines and curves. Although FIGS. 1 to 3 illustrate that the third reflective surface 123 is formed as a line perpendicular to the central axis, the third reflective surface 123 is not limited thereto.

Although most light rays totally reflected by the first reflective surface 110 are incident on the refractive surface 130, some light rays may be incident on the third reflective surface 123. In addition, although most light rays incident on the refractive surface 130 pass through the refractive surface 130 and are diffused out of the lens, some light rays may be reflected into the lens and incident on the third reflective surface 123.

The third reflective surface 123 may have a pattern entirely or partially formed thereon. According to an embodiment, the pattern of the third reflective surface 123 may be formed by surface corrosion. Chemical corrosion using acids and bases or physical corrosion using sand blasting may be applied to the surface corrosion.

The refractive surface 130 connects the first reflective surface 110 with the bottom surface 120. The refractive surface 130 may include a first refractive surface 131 and a second refractive surface 132, and the first refractive surface 131 and the second refractive surface 132 may be distinguished from each other by directions of the slopes thereof. More particularly, the refractive surface 130 may include the first refractive surface 131 inclined by a second angle θ2 with respect to the central axis of the lens and the second refractive surface 132 inclined by a third angle θ3 with respect to the central axis of the lens. In this regard, the second angle θ2 may be greater than the third angle θ3. More particularly, the second angle θ2 may be an obtuse angle in the range of 90° to 180°, and the third angle θ3 may be an acute angle in the range of 0° to 90°.

The angles of the first refractive surface 131 and the second refractive surface 132 may be determined to uniformly distribute light on a given surface. As the angle of the first refractive surface 131 approaches 90°, brightness of light emitted toward the center of the lens may increase. As the angle of the first refractive surface 131 approaches 180°, brightness of light emitted toward the center of the lens may decrease. Thus, the slope of the first refractive surface 131 may be adjusted according to the intended application thereof.

Light incident on the second refractive surface 132 is light that has passed through the first light incident surface 121a and then has been reflected by the first reflective surface 110. More particularly, most light rays incident on the second refractive surface 132 are light rays having been totally reflected by portions of the first reflective surface 110 closer to the central axis of the lens.

The range of light proceeding toward the second refractive surface 132 may be determined by the angle of the first light incident surface 121a, the angle of the first reflective surface 110, the distance between the first reflective surface 110 and the second refractive surface 132, and a ratio of the first refractive surface 131 and the second refractive surface 132.

Particularly, as the angle of the first light incident surface 121a approaches 90°, light having passed through the first light incident surface 121a arrives at portions of the first reflective surface 110 closer to the central axis. Thus, an amount of light proceeding toward the second refractive surface 132 increases.

In addition, as the angle of the first reflective surface 110 approaches 90°, an amount of light proceeding toward the second refractive surface 132 increases.

In addition, as the distance between the first reflective surface 110 and the refractive surface 130 increases and as the ratio of the second refractive surface 132 to the first refractive surface 131 increases, the amount of light proceeding toward the second refractive surface 132 increases.

Thus, the amount of light proceeding toward the second refractive surface 132 may be adjusted in consideration of the aforementioned conditions according to the intended application thereof.

According to an embodiment, a transverse cross-section of the reflective diffusion lens 100 may have a diameter that increases and then decreases in a direction from the first reflective surface 110 to the bottom surface 120. Hereinafter, the direction from the first reflective surface 110 to the bottom surface 120 may be referred to as a first direction for descriptive convenience. More particularly, the diameter of the transverse cross-section of the reflective diffusion lens 100 including the first refractive surface 131 may increase in the first direction, and the diameter of the transverse cross-section of the reflective diffusion lens 100 including the second refractive surface 132 may decrease in the first direction.

According to an embodiment, the reflective diffusion lens 100 may have the transverse cross-sections such that a diameter variation rate thereof has at least one inflection point in the first direction. According to an embodiment, the diameter of the transverse cross-section of the reflective diffusion lens 100 may gradually increase in the direction from the first reflective surface 110 to the bottom surface 120 and is uniformly maintained parallel to the central axis.

Figure 8:
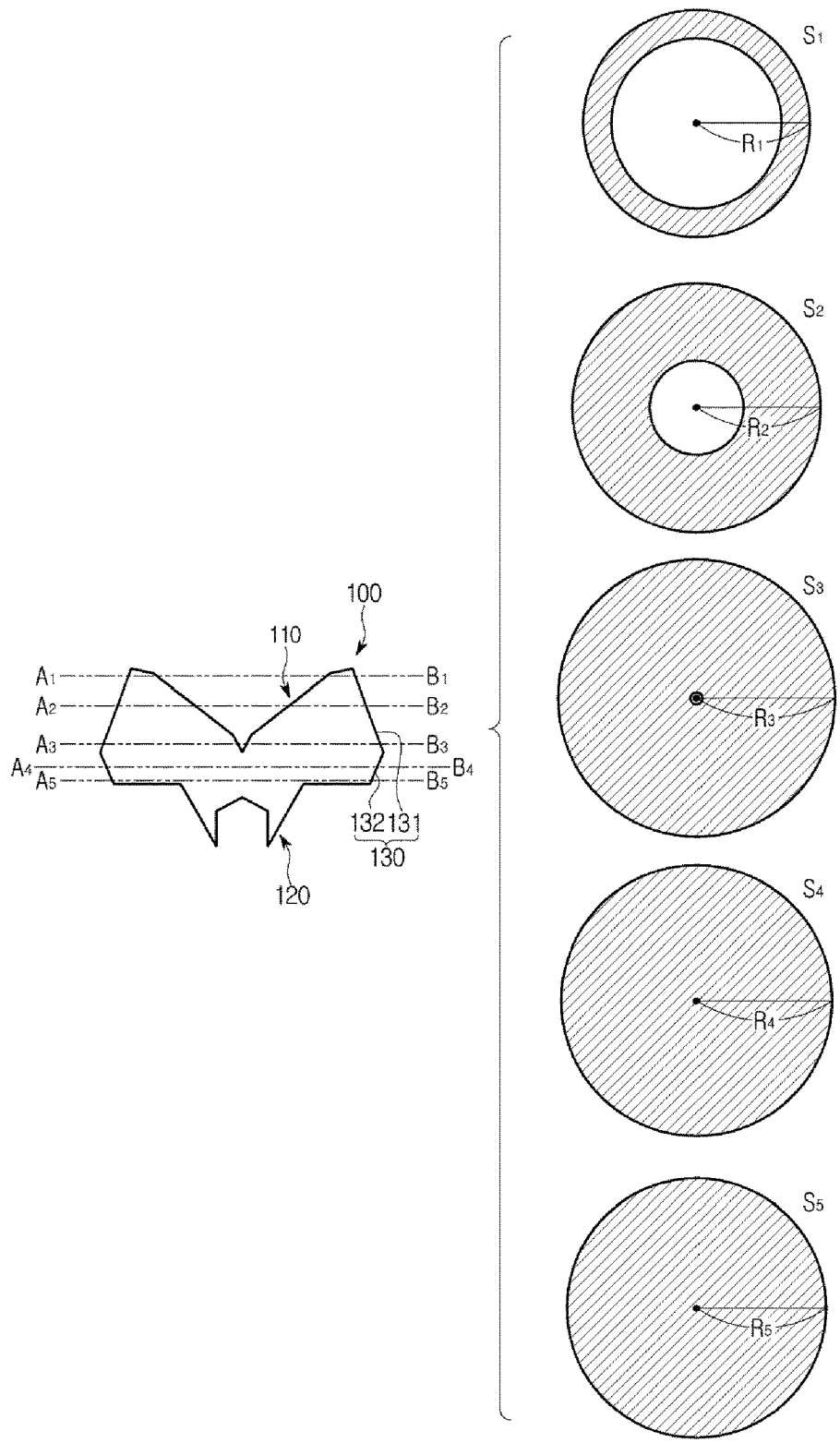
FIG. 8 is a view exemplarily illustrating transverse cross-sections of a reflective diffusion lens according to an embodiment of the present disclosure.

FIG. 8 is a view exemplarily illustrating transverse cross-sections of a reflective diffusion lens according to an embodiment. FIG. 8 sequentially illustrates transverse cross-sections S1 to S5 of the reflective diffusion lens respectively taken along lines A1-B1, A2-B2, A3-B3, A4-B4, and A5-B5. In FIG. 8, R1 to R5 denote radii of the transverse cross-sections S1 to S5, respectively.

Referring to FIG. 8, the diameters of the transverse cross-sections S1 to S3 of the reflective diffusion lens 100 including the first refractive surface 131 increase in the direction from the first reflective surface 110 to the bottom surface 120. That is, the diameters satisfy relations of R1<R2<R3.

On the contrary, the diameters of the transverse cross-sections S4 and S5 of the reflective diffusion lens 100 including the second refractive surface 132 decrease in the direction from the first reflective surface 110 to the bottom surface 120. That is the diameters satisfy relations of R4>R5. According to an embodiment, the diameters may also satisfy relations of R4=R5.

At least one of the first reflective surface 110, the bottom surface 120, and the refractive surface 130 may be symmetrical about the central axis. Particularly, each of the first reflective surface 110, the bottom surface 120, and the refractive surface 130 may have a rotationally symmetrical structure about the central axis.

The structure of the reflective diffusion lens 100 according to an embodiment is described above.

Hereinafter, a path of light entering the reflective diffusion lens 100 according to an embodiment will be described in detail with reference to examples thereof. Since the reflective diffusion lens 100 provides improved light diffusing effect compared with conventional diffusion lenses, the principle of light diffusion will be described based on optical path formation.

Figure 9:
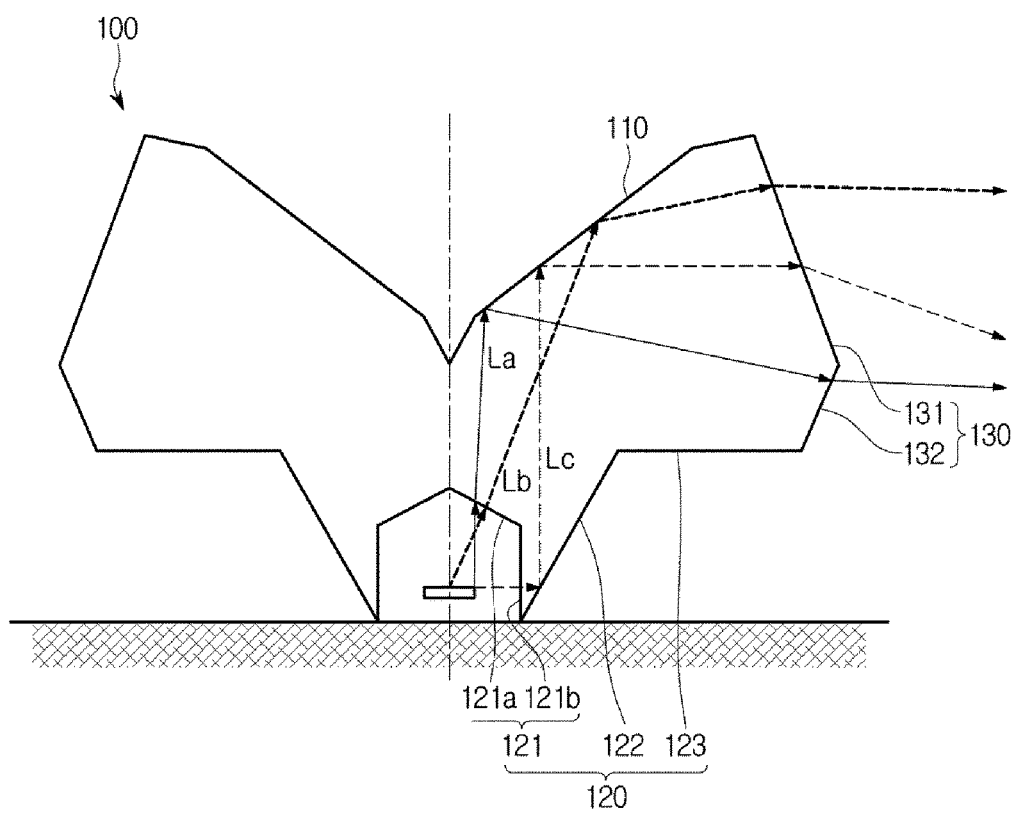
FIG. 9 is a diffusion path of light according to an embodiment of the present disclosure.

FIG. 9 is a diffusion path of light according to an embodiment. With reference to FIG. 9, the diffusion path of light will be described by exemplarily describing a case in which light rays La, Lb, and Lc are emitted from the light source for descriptive convenience.

Referring to FIG. 9, light emitted from the light source may enter the lens after passing through the light incident surface 121. In this case, light entering the lens may be refracted while passing through the light incident surface 121, and the refracted light may be incident on the first reflective surface 110 or the second reflective surface 122 in accordance with the angle of the light incident surface 121 and the angle of incidence of light with respect to the light incident surface 121.

Light incident on the first reflective surface 110 or the second reflective surface 122 is totally reflected. More particularly, the angle of the first reflective surface 110 and the angle of the second reflective surface 122 are adjusted such that light incident thereon is totally reflected as described above, and thus all light rays incident on the first reflective surface 110 and the second reflective surface 122 are totally reflected.

Light totally reflected by the second reflective surface 122 is incident on the first reflective surface 110, and light totally reflected by the first reflective surface 110 is incident on the refractive surface 130.

Light incident on the refractive surface 130 is diffused out of the lens after passing through the refractive surface 130. Since the refractive surface 130 includes the first refractive surface 131 and the second refractive surface 132, light incident on the refractive surface 130 is diffused out of the lens after passing through the first refractive surface 131 or the second refractive surface 132.

According to an embodiment, light rays La and Lb incident on the first light incident surface 121a of the light incident surface 121 are refracted at the first light incident surface 121a and incident on the first reflective surface 110. In this case, the light rays La and Lb are incident at different angles with respect to the central axis of the lens and arrive at different positions of the first reflective surface 110. In other words, the light ray La incident at a smaller angle with respect to the central axis of the lens is incident on one position of the first reflective surface 110 closer to the central axis of the lens, and the light ray Lb incident at a greater angle with respect to the central axis of the lens is incident on another position of the first reflective surface 110 farther from the central axis of the lens by a predetermined distance.

The light ray La incident on the closer position of the first reflective surface 110 to the central axis of the lens is totally reflected by the first reflective surface 110 and incident on the second refractive surface 132. The light ray La incident on the second refractive surface 132 is refracted at the second refractive surface 132 and diffused out of the lens. Meanwhile, the light ray La incident on the second refractive surface 132 may partially return to the inside of the lens to be incident on the second reflective surface 122 or third reflective surface 123.

The light ray Lb incident on the farther position of the first reflective surface 110 from the central axis of the lens by a predetermined distance is totally reflected by the first reflective surface 110 and incident on the first refractive surface 131. The light ray Lb incident on the first refractive surface 131 is refracted at the first refractive surface 131 and diffused out of the lens. Meanwhile, the light ray Lb incident on the first refractive surface 131 may partially return to the inside of the lens to be incident on the second reflective surface 122 or the third reflective surface 123.

According to an embodiment, the light ray Lc incident on the second light incident surface 121b of the light incident surface 121 may be refracted at the second light incident surface 121b and incident on the second reflective surface 122. In this case, the light ray Lc incident on the second reflective surface 122 is totally reflected by the second reflective surface 122 and incident on the first reflective surface 110. The light ray Lc incident on the first reflective surface 110 is totally reflected by the first reflective surface 110 and incident on the first refractive surface 131. The light ray Lc incident on the first refractive surface 131 is refracted at the first refractive surface 131 and diffused out of the lens. Meanwhile, the light ray Lc incident on the first refractive surface 131 may partially return to the inside of the lens to be incident on the second reflective surface 122 or the third reflective surface 123.

The shape of the reflective diffusion lens 100 and optical paths in the reflective diffusion lens 100 are described above.

Then, various embodiments of the reflective diffusion lens 100 will be described. FIGS. 10 to 13 are views illustrating examples of reflective diffusion lenses according to various embodiments.

Figure 10:
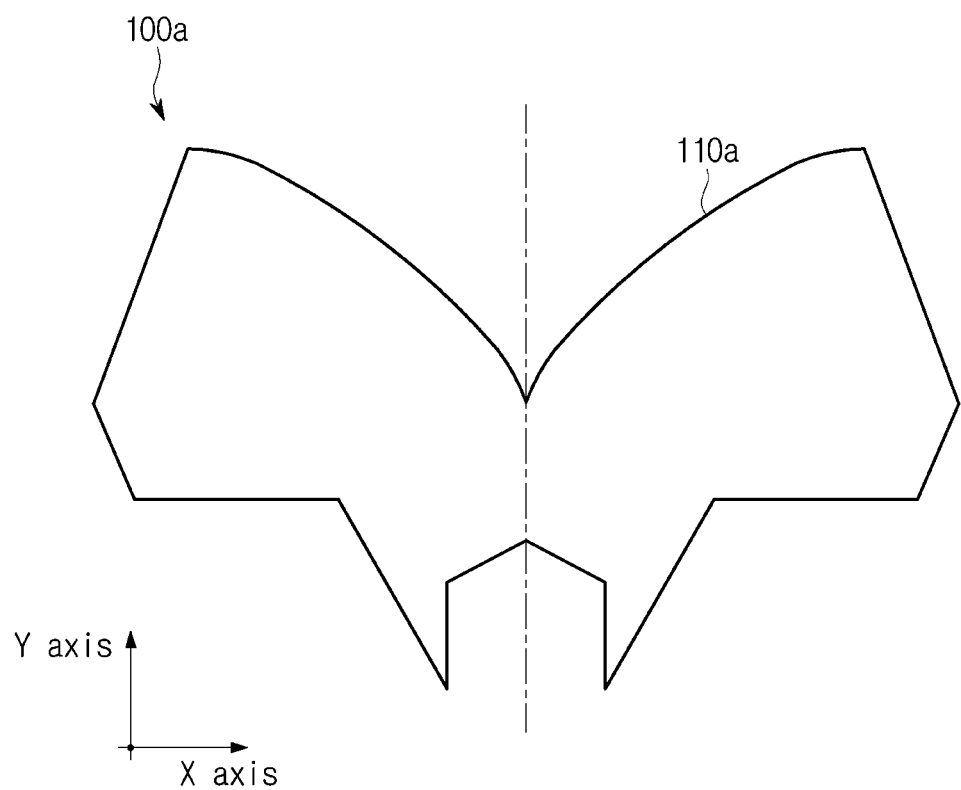
FIGS. 10 to 13 are views illustrating examples of reflective diffusion lenses according to various embodiments of the present disclosure.
Figure 11:
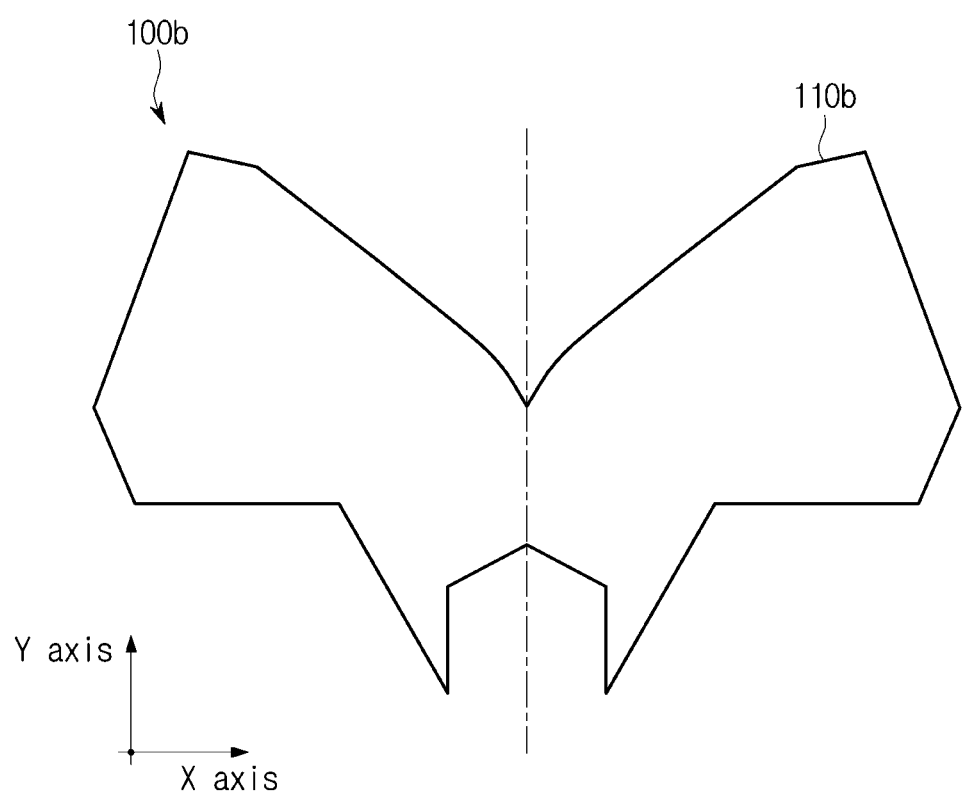

Referring to FIGS. 10 and 11, reflective diffusion lenses 100a and 100b according to another embodiment have similar configurations to that of the reflective diffusion lens 100 described above with reference to FIGS. 1 to 3. In FIGS. 10 and 11, only first reflective surfaces 110a and 110b are differently formed. Hereinafter, descriptions will be given based on differences from the reflective diffusion lens 100 of FIGS. 1 to 3.

Referring to FIG. 10, in the reflective diffusion lens 100a according to another embodiment, the first reflective surface 110a may have a longitudinal cross-section formed of a single curve. A curvature of the first reflective surface 110a of the reflective diffusion lens 100a according to the present embodiment may be designed within a range satisfying total reflection conditions of light incident on the first reflective surface 110a.

Referring to FIG. 11, in the reflective diffusion lens 100b according to another embodiment, the first reflective surface 110b may have a longitudinal cross-section formed of at least one line and curve. For example, one portion of the longitudinal cross-section of the first reflective surface 110b around the central axis of the lens may have a curved shape, and the other portion of the longitudinal cross-section of the first reflective surface 110b may have a linear shape. A curvature or slope of the first reflective surface 110b of the reflective diffusion lens 100b may be determined within a range satisfying total reflection conditions of light incident on the first reflective surface 110b.

Figure 12:
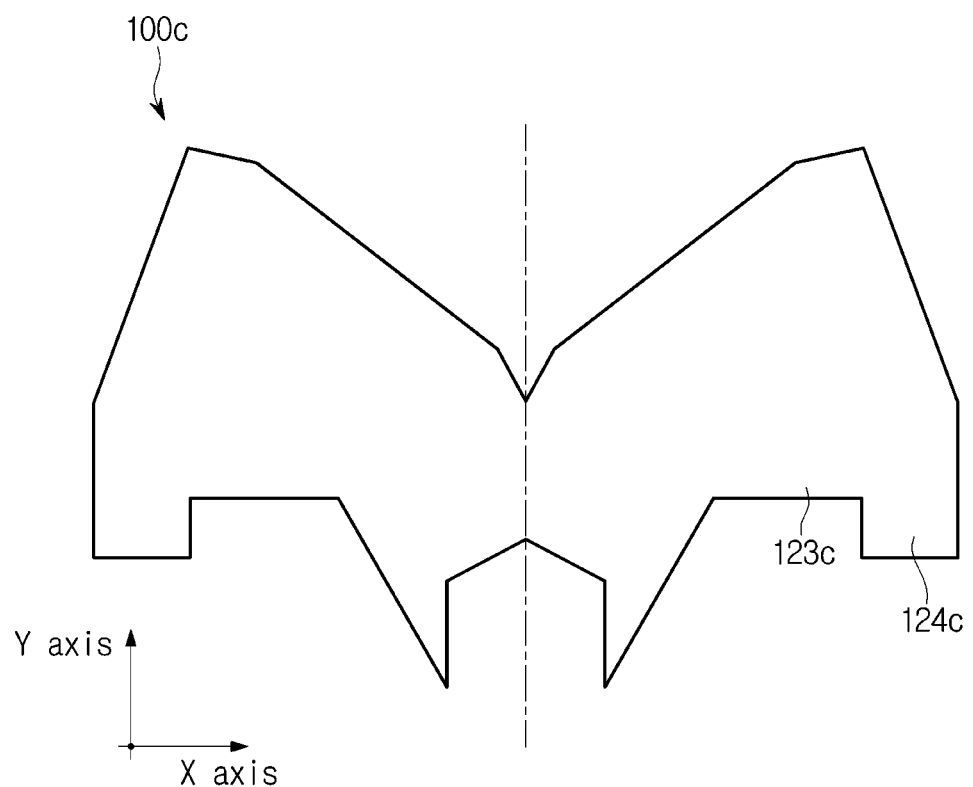
Figure 13:
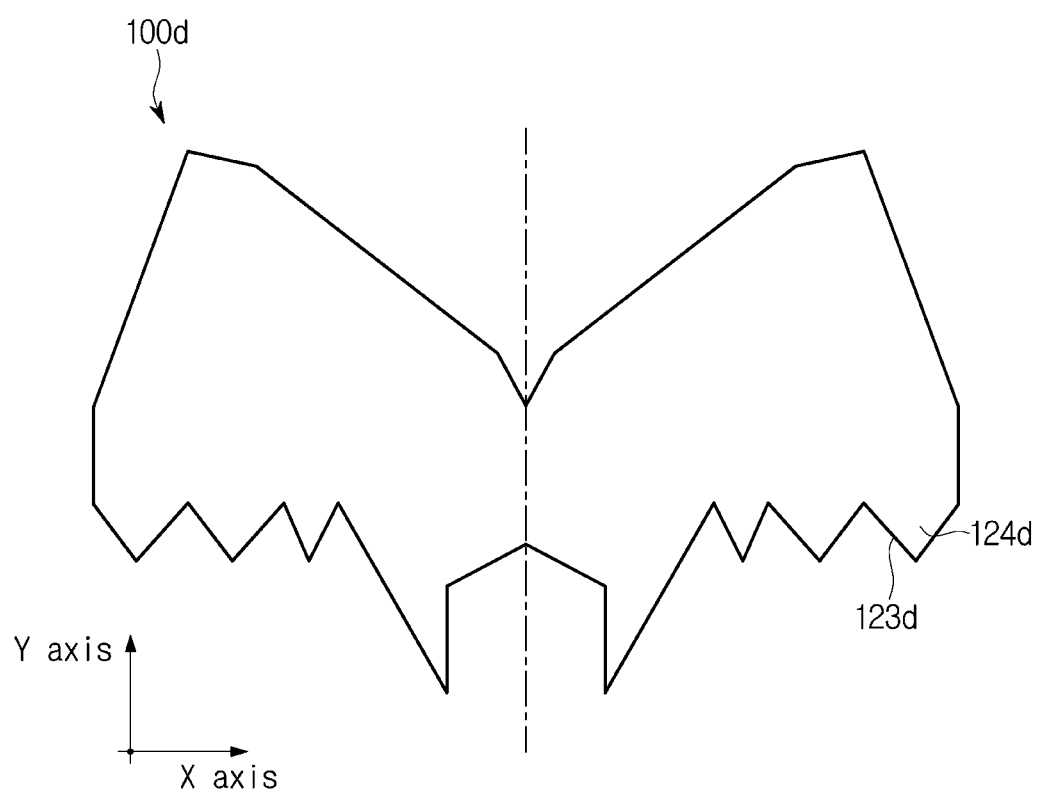

Referring to FIGS. 12 and 13, reflective diffusion lenses 100c and 100d according to another embodiment have similar configurations to that of the reflective diffusion lens 100 described above with reference to FIGS. 1 to 3. In FIGS. 12 and 13, only third reflective surfaces 123c and 123d are differently formed. Hereinafter, descriptions will be given based on differences from the reflective diffusion lens 100 of FIGS. 1 to 3.

Referring to FIGS. 12 and 13, the third reflective surfaces 123c and 123d of the reflective diffusion lenses 100c and 100d according to the present embodiment may have patterns 124c and 124d, respectively. The patterns 124c and 124d may have various shapes. For example, the longitudinal cross-section thereof may have a rectangular shape as illustrated in FIG. 12, or the longitudinal cross-section thereof may have a triangular shape as illustrated in FIG. 13.

By forming the patterns 124c and 124d on the third reflective surfaces 123c and 123d, light incident on the third reflective surfaces 123c and 123d may be uniformly reflected into the lens.

Various embodiments of the reflective diffusion lens are described above.

Hereinafter, a lighting installation including a reflective diffusion lens will be described.

Figure 14:
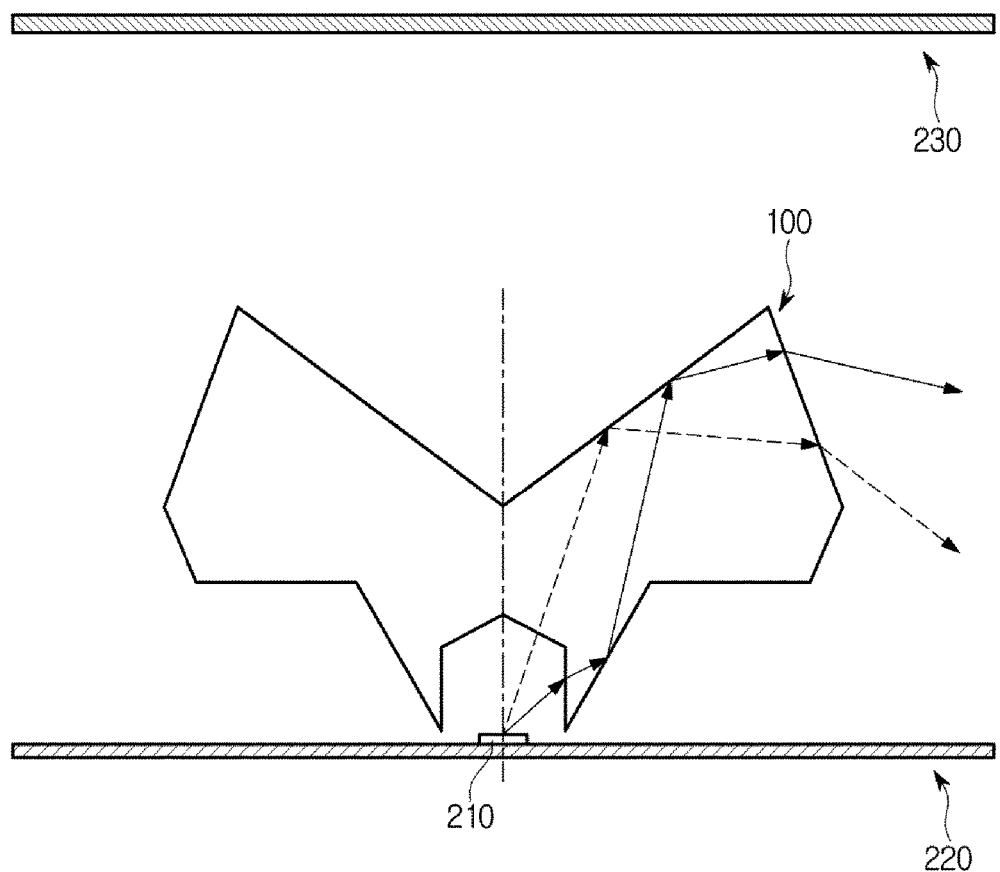
FIG. 14 is a view illustrating a structure of a lighting installation including the reflective diffusion lens according to an embodiment of the present disclosure.

FIG. 14 is a view illustrating a structure of a lighting installation 200 including the reflective diffusion lens 100 according to an embodiment.

Referring to FIG. 14, the lighting installation 200 includes the reflective diffusion lens 100, a light source 210, a reflection plate 220, and a diffusion plate 230.

The light source 210 may be disposed on the reflection plate 220 or a printed circuit board (PCB) to be adjacent to the bottom surface 120 of the reflective diffusion lens 100. More particularly, the light incident surface 121 of the reflective diffusion lens 100 may surround the light source 210. At least one light source 210 may be installed, or a plurality of light sources may be arranged to be spaced at fixed intervals.

The light source 210 that is a device to emit light may include a light emitting diode (LED) or an organic light emitting diode (OLED).

The reflective diffusion lens 100 may be arranged on the reflection plate 220 or the PCB. The lighting installation 200 according to an embodiment may include at least one reflective diffusion lens 100 in accordance with a width of the reflection plate 220 and desired intensity of light.

The reflective diffusion lens 100 may diffuse light to the surroundings to change light of a point light source or a line light source into light of a surface light source.

The reflection plate 220 may be disposed under the reflective diffusion lens 100 and the light source 210. The reflection plate 220 may also include a structure to fix the reflective diffusion lens 100 and the light source 210.

The reflection plate 220 is a device to reflect light diffused from sides of the reflective diffusion lens 100. According to an embodiment, a white reflection film may be used as the reflection plate 220. The light diffused from the reflective diffusion lens 100 may be incident on the reflection plate 220. If light is reflected by the reflection plate 220 and diffused, distribution of emitted light may be adjusted in accordance with light reflectivity of the reflection plate 220.

In general, the reflection plate 220 has a light reflectivity of 80 to 90%, and the light reflectivity of the reflection plate 220 may be adjusted in accordance with desired brightness of the lighting installation 200. As light reflectivity of the reflection plate 220 increases, an amount of light emitted out of the lens through the diffusion plate 230 increases. As light reflectivity of the reflection plate 220 decreases, the amount of light emitted out of the lens via the diffusion plate 230 decreases.

The diffusion plate 230 may be disposed above the reflective diffusion lens 100 and may include a structure to fix the reflective diffusion lens 100, the light source 210, and the reflection plate 220.

The diffusion plate 230 is an optically transparent plate including a surface pattern or an inner light diffusing agent to more uniformly radiate light that has passed through the reflective diffusion lens. The diffusion plate 230 may more uniformly distribute light diffused from the reflective diffusion lens 100 or the reflection plate 220 and may adjust the amount of light, if required.

As is apparent from the above description, the reflective diffusion lens according to the present disclosure has two reflective surfaces and two refractive surfaces to improve light diffusing effect and facilitate processing thereof.

By using the reflective diffusion lens according to the present disclosure, the distance between the light sources may be increased and the thickness of the lighting installation may be decreased.

The reflective diffusion lens according to the present disclosure may be used to design and manufacture thin lighting installations having various sizes.

Although the reflective diffusion lens and the lighting installation including the reflective diffusion according to various embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A reflective diffusion lens comprising:
    a first reflective surface that is concave and has a longitudinal cross-section with a parabola shape or normal distribution shape to totally reflect incident light;
    a bottom surface including a light incident surface concave toward the first reflective surface, and a second reflective surface having a longitudinal cross-section inclined by a first angle with respect to a central axis of the reflective diffusion lens to totally reflect incident light; and
    a refractive surface connecting the first reflective surface with the bottom surface, the refractive surface including a first refractive surface having a longitudinal cross-section inclined by a second angle with respect to the central axis of the reflective diffusion lens and a second refractive surface having a longitudinal cross-section inclined by a third angle with respect to the central axis of the reflective diffusion lens,
    wherein the refractive surface is configured so that light incident on the refractive surface is diffused out of the reflective diffusion lens, and
    wherein a transverse cross-section of the reflective diffusion lens comprising the first refractive surface has a diameter increasing in a direction from the first reflective surface to the bottom surface, and the transverse cross-section of the reflective diffusion lens comprising the second refractive surface has a diameter decreasing in the direction from the first reflective surface to the bottom surface.

2. The reflective diffusion lens according to claim 1, wherein the second angle is an obtuse angle, and the third angle is an acute angle.

3. The reflective diffusion lens according to claim 1, wherein the second angle is greater than the third angle.

4. The reflective diffusion lens according to claim 1, wherein the transverse cross-section of the reflective diffusion lens has a diameter variation rate comprising at least one inflection point in the direction from the first reflective surface to the bottom surface.

5. The reflective diffusion lens according to claim 1, wherein the second reflective surface has a longitudinal cross-section inclined by the first angle with respect to the central axis of the reflective diffusion lens to totally reflect incident light toward the first reflective surface.

6. The reflective diffusion lens according to claim 1, wherein the bottom surface further comprises a third reflective surface connecting the second reflective surface with the refractive surface.

7. The reflective diffusion lens according to claim 6, wherein the third reflective surface has a longitudinal cross-section formed of at least one line, at least one curve, or a combination of lines and curves.

8. The reflective diffusion lens according to claim 1, wherein the light incident surface has a longitudinal cross-section formed of a plurality of lines, at least one curve, or a combination of lines and curves.

9. The reflective diffusion lens according to claim 1, wherein the reflective diffusion lens is symmetrical about the central axis of the reflective diffusion lens.

10. The reflective diffusion lens according to claim 1, wherein the reflective diffusion lens has a rotationally symmetrical structure about the central axis of the reflective diffusion lens.

11. The reflective diffusion lens according to claim 1, wherein at least one selected from the group consisting of the first reflective surface, the bottom surface, and the refractive surface has a pattern entirely or partially formed thereon.

12. A lighting installation comprising:
   a light source;
   a reflective diffusion lens arranged to be adjacent to the light source and configured to diffuse light emitted from the light source; and
   a reflection plate configured to support the light source and the reflective diffusion lens and adjust a direction or amount of incident light,
   wherein the reflective diffusion lens comprises:
      a first reflective surface that is concave and has a longitudinal cross-section with a parabola shape or normal distribution shape to totally reflect incident light;
      a bottom surface including a light incident surface concave toward the first reflective surface, and a second reflective surface having a longitudinal cross-section inclined by a first angle with respect to a central axis of the reflective diffusion lens to totally reflect incident light; and
      a refractive surface connecting the first reflective surface with the bottom surface, the refractive surface including a first refractive surface having a longitudinal cross-section inclined by a second angle with respect to the central axis of the reflective diffusion lens and a second refractive surface having a longitudinal cross-section inclined by a third angle with respect to the central axis of the reflective diffusion lens,
   wherein the refractive surface is configured so that light incident on the refractive surface is diffused out of the reflective diffusion lens, and
   wherein a transverse cross-section of the reflective diffusion lens comprising the first refractive surface has a diameter increasing in a direction from the first reflective surface to the bottom surface, and the transverse cross-section of the reflective diffusion lens comprising the second refractive surface has a diameter decreasing in the direction from the first reflective surface to the bottom surface.

13. The lighting installation according to claim 12, wherein the second angle is an obtuse angle, and the third angle is an acute angle.

14. The lighting installation according to claim 12, wherein the second angle is greater than the third angle.

15. The lighting installation according to claim 12, wherein the transverse cross-section of the reflective diffusion lens has a diameter variation rate comprising at least one inflection point in the direction from the first reflective surface to the bottom surface.

16. The lighting installation according to claim 12, wherein the second reflective surface has a longitudinal cross-section inclined by the first angle with respect to the central axis of the reflective diffusion lens to totally reflect incident light toward the first reflective surface.

* * * * *